US010725794B2

(12) United States Patent
Nasu et al.

(10) Patent No.: US 10,725,794 B2
(45) Date of Patent: Jul. 28, 2020

(54) DATA PROCESSING DEVICE, DATA PROCESSING METHOD, SETTING MANAGEMENT DEVICE, AND DATA PROCESSING SYSTEM

(71) Applicant: Mitsubishi Electric Corporation, Tokyo (JP)

(72) Inventors: Osamu Nasu, Tokyo (JP); Naoyuki Kimura, Aichi (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/346,133

(22) PCT Filed: Mar. 3, 2017

(86) PCT No.: PCT/JP2017/008617
§ 371 (c)(1),
(2) Date: Apr. 30, 2019

(87) PCT Pub. No.: WO2018/158956
PCT Pub. Date: Sep. 7, 2018

(65) Prior Publication Data
US 2019/0361712 A1 Nov. 28, 2019

(51) Int. Cl.
*G06F 9/54* (2006.01)
*G06F 9/445* (2018.01)
*G06F 9/46* (2006.01)

(52) U.S. Cl.
CPC .......... *G06F 9/44505* (2013.01); *G06F 9/466* (2013.01)

(58) Field of Classification Search
CPC .............................. G06F 9/45512; G06F 9/542

USPC .................................................. 719/318, 320
See application file for complete search history.

(56) References Cited

U.S. PATENT DOCUMENTS

| 8,542,104 | B2* | 9/2013 | Horowitz | H04L 67/125 340/10.1 |
| 9,734,693 | B2* | 8/2017 | McKinley | G08B 25/10 |
| 9,740,186 | B2 | 8/2017 | Nakagawa et al. | |
| 10,113,941 | B2* | 10/2018 | Kostyukov | G05B 13/024 |
| 10,281,909 | B2* | 5/2019 | Im | G05B 23/0221 |

(Continued)

FOREIGN PATENT DOCUMENTS

| CN | 105209988 A | 12/2015 |
| JP | H02-006305 U | 1/1990 |

(Continued)

OTHER PUBLICATIONS

German Office Action dated Sep. 11, 2019 in German Application No. 11 2017 005 554.7.

(Continued)

*Primary Examiner* — Andy Ho
(74) *Attorney, Agent, or Firm* — Xsensus LLP

(57) ABSTRACT

A data processing device includes: a functional-process-module storage unit to store a functional process module for data processing; a setting-information storage unit to store setting information for an execution sequence of a plurality of the functional process modules and for target input data on which the functional process module performs a functional process; and a process manager unit to cause the functional process module to perform a functional process on the target input data on a basis of a sequence set in the setting information.

11 Claims, 16 Drawing Sheets

(56) References Cited

U.S. PATENT DOCUMENTS

| | | |
|---|---|---|
| 2003/0028687 A1 | 2/2003 | Goosen et al. |
| 2007/0044009 A1 | 2/2007 | Tokunaga |
| 2016/0054718 A1 | 2/2016 | Nakagawa et al. |
| 2017/0082989 A1 | 3/2017 | Kumagai et al. |

FOREIGN PATENT DOCUMENTS

| | | |
|---|---|---|
| JP | 2001-100809 A | 4/2001 |
| JP | 2003-507816 A | 2/2003 |
| JP | 2007-047862 A | 2/2007 |
| JP | 2012-048331 A | 3/2012 |
| JP | 2013-096668 A | 5/2013 |
| JP | 2014-089706 A | 5/2014 |
| JP | 2014-146116 A | 8/2014 |
| JP | 2017-123610 A | 7/2017 |
| TW | 201007399 A | 2/2010 |
| TW | 201600948 A | 1/2016 |
| WO | 01/14979 A1 | 3/2001 |
| WO | 2015/146281 A1 | 10/2015 |

OTHER PUBLICATIONS

Notification of Reasons for Refusal a Patent received for Japanese Patent Application No. 2018-506633, dated May 22, 2018, 6 pages including English Translation.

Decision to Grant a Patent received for Japanese Patent Application No. 2018-506633, dated Aug. 2, 2018, 6 pages including English Translation.

International Search Report and Written Opinion dated May 23, 2017 for PCT/JP2017/008617 filed on Mar. 3, 2017, pages including English Translation of International Search Report.

Office Action received for Taiwan Patent Application No. 107106174, dated Jan. 30, 2019, 21 pages including English Translation.

Chinese Office Action dated Nov. 21, 2019 in Chinese Application No. 201780074373.5.

Office Action dated Mar. 16, 2020 in Chinese Patent Application No. 201780074373.5, 18 pages.

* cited by examiner

| No. | APPLICATION IDENTIFICATION INFORMATION | PROTOCOL INFORMATION |
|---|---|---|
| 1 | APPLICATION #1 | PROTOCOL #1 |
| 2 | APPLICATION #2 | PROTOCOL #2 |
| 3 | APPLICATION #3 | PROTOCOL #3 |
| 4 | APPLICATION #4 | PROTOCOL #4 |

31

| SEQUENCE | PROCESS TYPE | PROCESS METHOD | INPUT DATA |
|---|---|---|---|
| 1 | COLLECTION | DEVICE 4 | INDUSTRIAL DATA |
| 2 | EDIT | EDIT MODULE | COLLECTED INDUSTRIAL DATA |
| 3 | DIAGNOSIS | DIAGNOSIS MODULE | EDITED INDUSTRIAL DATA |
| 4 | NOTIFICATION | NOTIFICATION MODULE | DIAGNOSIS RESULT DATA |
| 5 | | | |
| 6 | | | |

| DEVICE | MEMORY AREA |
|---|---|
| DEVICE #1 | D1 |
| DEVICE #2 | D2 |

FIG.17

DATA DIAGNOSIS FLOW SETTING No. [1]

NAME OF SETTING: DiagnosisFlow01   COMMENT:

DATA DIAGNOSIS FLOW SETTING

| No | PROCESS TYPE | PROCESS METHOD | MODULE NAME | PROCESS DETAILS | FILE SAVING |
|---|---|---|---|---|---|
| 1 | COLLECTION | – | COLLECTION SETTING 1 | SET | NOT SET |
| 2 | EDIT | DATA EDIT MODULE | DATA EDIT MODULE 1 | NOT SET | |
| 3 | EDIT | DATA EDIT MODULE | DATA EDIT MODULE 2 | NOT SET | |
| 4 | DETERMINATION | SIMILAR WAVEFORM RECOGNITION (EXECUTE ANALYZATION) | SIMILAR WAVEFORM RECOGNITION (EXECUTE ANALYZATION) | NOT SET | |
| 5 | ACTION | ACTION AFTER DETERMINATION | ACTION AFTER DETERMINATION | SET | |

ADD ROW   DELETE ROW

OK   CANCEL

DATA DIAGNOSIS FLOW SETTING No. [1]

NAME OF SETTING: DiagnosisFlow01      COMMENT:

DATA DIAGNOSIS FLOW SETTING

| No | PROCESS TYPE | PROCESS METHOD | MODULE NAME | PROCESS DETAILS | FILE SAVING |
|---|---|---|---|---|---|
| 1 | COLLECTION | --- | COLLECTION SETTING 1 | SET | NOT SET |
| 2 | EDIT | DATA EDIT MODULE | DATA EDIT MODULE 1 | NOT SET | |
| 3 | EDIT | DATA EDIT MODULE | DATA EDIT MODULE 2 | NOT SET | |
| 4 | DETERMINATION | SIMILAR WAVEFORM RECOGNITION (EXECUTE ANALYZATION) | SIMILAR WAVEFORM RECOGNITION (EXECUTE ANALYZATION) | NOT SET | |
| 5 | ACTION | ACTION AFTER DETERMINATION | ACTION AFTER DETERMINATION | SET | |

— 442

MISSING DATA INTERPOLATION (LINEAR INTERPOLATION) SETTING

INPUT/OUTPUT SETTING

IN MISSING-DATA INTERPOLATION (LINEAR INTERPOLATION), PROCESSING-TARGET DATA TO WHICH MISSING VALUE HAS BEEN INTERPOLATED DIRECTLY BECOMES OUTPUT DATA. SELECT PROCESSING-TARGET INPUT DATA. OUTPUT-DATA NAME CAN BE CHANGED.

INPUT DATA

| No | INPUT-DATA NAME | DATA TYPE |
|---|---|---|
| 1 | INJECTION MOLDING MACHINE TEMPERATURE | ... |
| 2 | INJECTION MOLDING MACHINE VOLTAGE | ... |

443 ---

DELETE ROW

43 ~

OUTPUT DATA

| No | OUTPUT-DATA NAME | DATA TYPE |
|---|---|---|
| 1 | TEMPERATURE | ... |
| 2 | VOLTAGE | ... |

444 ---

PARAMETER SETTING

SET PARAMETER FOR MISSING-DATA INTERPOLATION (LINEAR INTERPOLATION)

MAXIMUM NUMBER OF CONSECUTIVELY-MISSING VALUES (1 TO 10): 1

OK    CANCEL

FIG.19

| No | PROCESS TYPE | PROCESS METHOD | MODULE NAME | PROCESS DETAILS | FILE SAVING |
|---|---|---|---|---|---|
| 1 | COLLECTION | – | COLLECTION SETTING 1 | SET | NOT SET |
| 2 | EDIT | DATA EDIT MODULE | DATA EDIT MODULE 1 | NOT SET | |
| 3 | EDIT | DATA EDIT MODULE | DATA EDIT MODULE 2 | NOT SET | |
| 4 | DETERMINATION | SIMILAR WAVEFORM RECOGNITION (EXECUTE ANALYZATION) | SIMILAR WAVEFORM RECOGNITION (EXECUTE ANALYZATION) | NOT SET | |
| 5 | ACTION | ACTION AFTER DETERMINATION | ACTION AFTER DETERMINATION | SET | |

DATA DIAGNOSIS FLOW SETTING No. [1]

NAME OF SETTING: DiagnosisFlow01   COMMENT:

DATA DIAGNOSIS FLOW SETTING

TEMPERATURE → MISSING-VALUE PROCESSING → VALUE DETERMINATION
            → AVERAGING PROCESSING

ADD ROW   DELETE ROW

OK   CANCEL

FIG.20

DATA DIAGNOSIS FLOW SETTING No. [1]  ✕

| NAME OF SETTING | DiagnosisFlow01 | COM-MENT | |
|---|---|---|---|

DATA DIAGNOSIS FLOW SETTING

| No | PROCESS TYPE | PROCESS METHOD | PROGRAM NAME | PROCESS DETAILS | FILE SAVING |
|---|---|---|---|---|---|
| 1 | COLLECTION | -- | COLLECTION SETTING 1 | SET | NOT SET |
| 2 | EDIT | DATA EDIT PROGRAM | DATA EDIT PROGRAM 1 | NOT SET | |
| 3 | EDIT | DATA EDIT PROGRAM | DATA EDIT PROGRAM 2 | NOT SET | |
| 4 | DETERMINATION | SIMILAR WAVEFORM RECOGNITION (EXECUTE ANALYZATION) | SIMILAR WAVEFORM RECOGNITION (EXECUTE ANALYZATION) | NOT SET | |
| 5 | ACTION | ACTION AFTER DETERMINATION | ACTION AFTER DETERMINATION | SET | |

— 442

TEMPER-ATURE → MISSING-VALUE → VALUE DETERMI-

MISSING DATA INTERPOLATION (LINEAR INTERPOLATION) SETTING  ✕

INPUT/OUTPUT SETTING

IN MISSING-DATA INTERPOLATION (LINEAR INTERPOLATION), PROCESSING-TARGET DATA TO WHICH MISSING VALUE HAS BEEN INTERPOLATED DIRECTLY BECOMES OUTPUT DATA. SELECT PROCESSING-TARGET INPUT DATA. OUTPUT-DATA NAME CAN BE CHANGED.

INPUT DATA

| No | INPUT-DATA NAME | DATA TYPE |
|---|---|---|
| 1 | INJECTION MOLDING MACHINE TEMPERATURE | ... |
| 2 | INJECTION MOLDING MACHINE VOLTAGE | ... |
| | | |

DELETE ROW

OUTPUT DATA

| No | OUTPUT-DATA NAME | DATA TYPE |
|---|---|---|
| 1 | TEMPERATURE | ... |
| 2 | VOLTAGE | ... |

43

PARAMETER SETTING

SET PARAMETER FOR MISSING-DATA INTERPOLATION (LINEAR INTERPOLATION)

MAXIMUM NUMBER OF CONSECUTIVELY-MISSING VALUES (1 TO 10)  [ 1 ]

OK    CANCEL

DATA PROCESSING DEVICE, DATA PROCESSING METHOD, SETTING MANAGEMENT DEVICE, AND DATA PROCESSING SYSTEM

CROSS-REFERENCE TO RELATED APPLICATIONS

The present application is based on PCT filing PCT/JP2017/008617, filed Mar. 3, 2017, the entire contents of which are incorporated herein by reference.

FIELD

The present invention relates to a data processing device that processes industrial data, a data processing method, a setting management device, and a data processing system.

BACKGROUND

In recent years, attempts have been made to collect industrial data, such as data indicating an operational status of a production device and sensor data, and analyze the collected industrial data in order to use the analyzation result for improving productivity. Industrial data is analyzed by different methods depending on the purpose of use of the industrial data. Accordingly, there has been a demand for data processing devices in which an industrial-data collection unit and a collected industrial-data accumulation unit are used as common infrastructure and only a collected industrial-data analyzation unit can be replaced as desired.

For example, Patent Literature 1 discloses a system that collects and analyzes industrial data by a higher-level computer connected to a PLC and by a controller interposed between the higher-level computer and the PLC. A function extension module that is an analyzation unit or the like corresponding to the purpose of use of industrial data can be added to the controller, and the controller can implement various functions by executing the added functional extension module. Use of the controller described in Patent Literature 1 makes it possible to use industrial data for not only improving productivity, but also improving quality, for example.

CITATION LIST

Patent Literature

Patent Literature 1: Japanese Patent Application Laid-open No. 2001-100809

SUMMARY

Technical Problem

However, in a case where a function extension module is constructed of, for example, processes of edit, analyzation, and determination of industrial data according to the purpose of use of the industrial data, when the analyzation process is changed to another analyzation process using a different algorithm, the controller described in Patent Literature 1 requires replacement of the function extension module itself.

The present invention has been achieved to solve the above problems, and an object of the present invention is to provide a data processing device that is capable of extending the function with greater flexibility than conventional devices.

Solution to Problem

To solve the problem and achieve the object described above, a data processing device according to an aspect of the present invention includes: a functional-process-module storage unit to store a functional process module for data processing; a setting-information storage unit to store setting information for an execution sequence of a plurality of the functional process modules and for target input data on which the functional process module performs a functional process; and a process manager unit to cause the functional process module to perform a functional process on the target input data on a basis of a sequence set in the setting information.

Advantageous Effects of Invention

The data processing device according to the present invention has an effect where it is possible to extend the function with greater flexibility than conventional devices.

BRIEF DESCRIPTION OF DRAWINGS

FIG. 17 is a diagram illustrating a second example of the setting-information generation screen displayed by the setting management device illustrated in FIG. 14.

FIG. 18 is a diagram illustrating a detail setting screen linked with the setting-information generation screen illustrated in FIG. 17.

FIG. 19 is a diagram illustrating a third example of the setting-information generation screen displayed by the setting management device illustrated in FIG. 14.

FIG. 20 is a diagram illustrating a detail setting screen linked with the setting-information generation screen illustrated in FIG. 19.

DESCRIPTION OF EMBODIMENTS

A data processing device, a data processing method, a setting management device, and a data processing system according to embodiments of the present invention will be described in detail below with reference to the accompanying drawings. The present invention is not limited to the embodiments.

Embodiment

Figure 1:
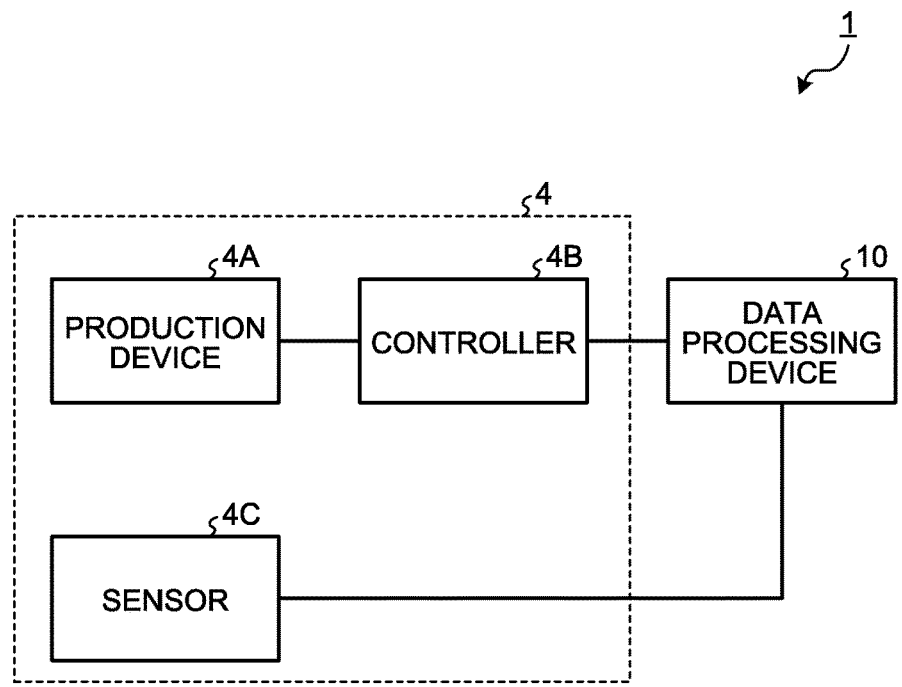
FIG. 1 is a diagram illustrating a configuration of a data processing system according to an embodiment of the present invention.

FIG. 1 is a diagram illustrating a configuration of a data processing system according to an embodiment of the present invention. A data processing system 1 illustrated in FIG. 1 includes a data processing device 10 and a device 4 connected to the data processing device 10.

The device 4 is an industrial-data obtaining device such as a production device 4A, a controller 4B that controls the production device 4A, and a sensor 4C mounted on the production device 4A. The production device 4A is a device to be used at a production site such as a factory. Examples of the production device 4A include a molding device, an inspection device, a conveyance device, and a machining device. The controller 4B is, for example, a PLC (Programmable Logic Controller, which is also referred to as "programmable controller") that automatically controls a series of events including the operational sequence of the production device 4A. Industrial data refers to various types of data generated at a production site. The industrial data includes data indicating the status of the production device 4A, such as a temperature, a voltage, a current, a distance, a velocity, an operating time of the production device 4A, and the number of times an error occurs in the production device 4A, data indicating conditions of workers who make the production device 4A ready for operation, the number of workers, and the like, and data indicating the scheduled production quantity. The production device 4A, the controller 4B, and the sensor 4C are specific examples of the device 4. When the production device 4A, the controller 4B, and the sensor 4C do not need to be particularly distinguished from each other, these elements are hereinafter collectively referred to as "device 4". The device 4 is not limited to the specific examples described above as long as the device 4 can obtain industrial data. For example, the device 4 may be constituted of only the production device 4A and the controller 4B. In a broader sense, the term "industrial" described in the present embodiment refers to manufacturing industry, agricultural industry, fishing industry, and the like. Industrial data is data to be handled in the industry. For example, in the manufacturing field, the industrial data refers to data to be handled in factories, for infrastructure management, in storehouses, buildings, and offices, and at home. In relation to this, the production site refers to a site in each industry having devices installed, and it is not limited to the production site of a factory.

The data processing device 10 performs a series of functional processes on industrial data, such as obtaining, editing, and diagnosing industrial data, and notification of the diagnosis result. The data processing device 10 also has a platform on which each function of the series of functional processes can be easily changed. The data processing device 10 has a feature of setting a plurality of functional processes desired by a user and thereafter sequentially performing the series of functional processes on industrial data in a predetermined sequence to thereby implement the series of functional processes in real time.

Further, the data processing device 10 has a function of converting the format of input data to the data processing device 10 and the format of output data from the data processing device 10 into an appropriate data format so as to be compatible with various protocols.

Figure 2:
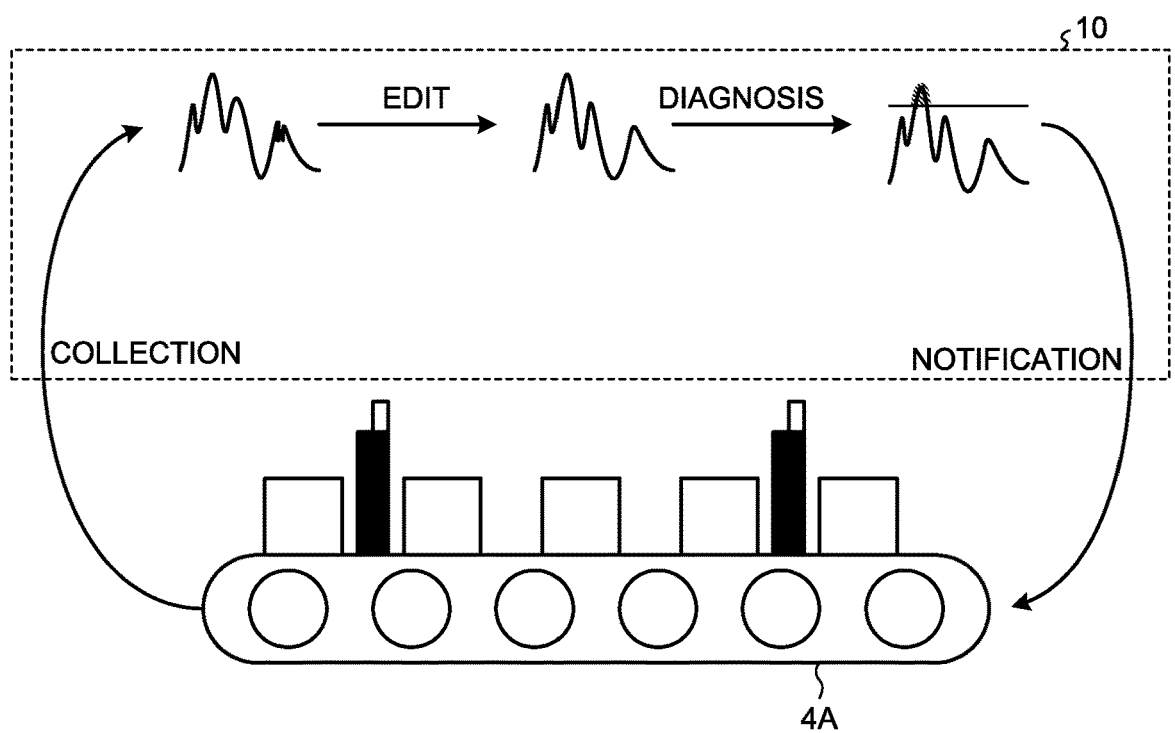
FIG. 2 is a conceptual diagram illustrating a flow of functional processes performed by the data processing system illustrated in FIG. 1.

FIG. 2 is a conceptual diagram illustrating a flow of functional processes performed by the data processing system illustrated in FIG. 1. When the data processing device 10 collects industrial data from the production device 4A via the controller 4B or collects industrial data from the sensor 4C, the data processing device 10 edits the industrial data, diagnoses the status of the production device 4A using the edited industrial data, and notifies the production device 4A of the diagnosis result. Notification of the diagnosis result may be made only in a case where an abnormality is detected. While the production device 4A is notified of the diagnosis result in FIG. 2, it is also permissible that, for example, the controller 4B or a display device (not illustrated) is notified of the diagnosis result. It is further permissible that notification of the diagnosis result is made by transmitting an e-mail to an e-mail address registered in advance. It is desirable to notify an operator of the production device 4A or the controller 4B that controls the production device 4A of the diagnosis result so that when an abnormality is detected in the production device 4A, the production device 4A can be operated.

Figure 3:
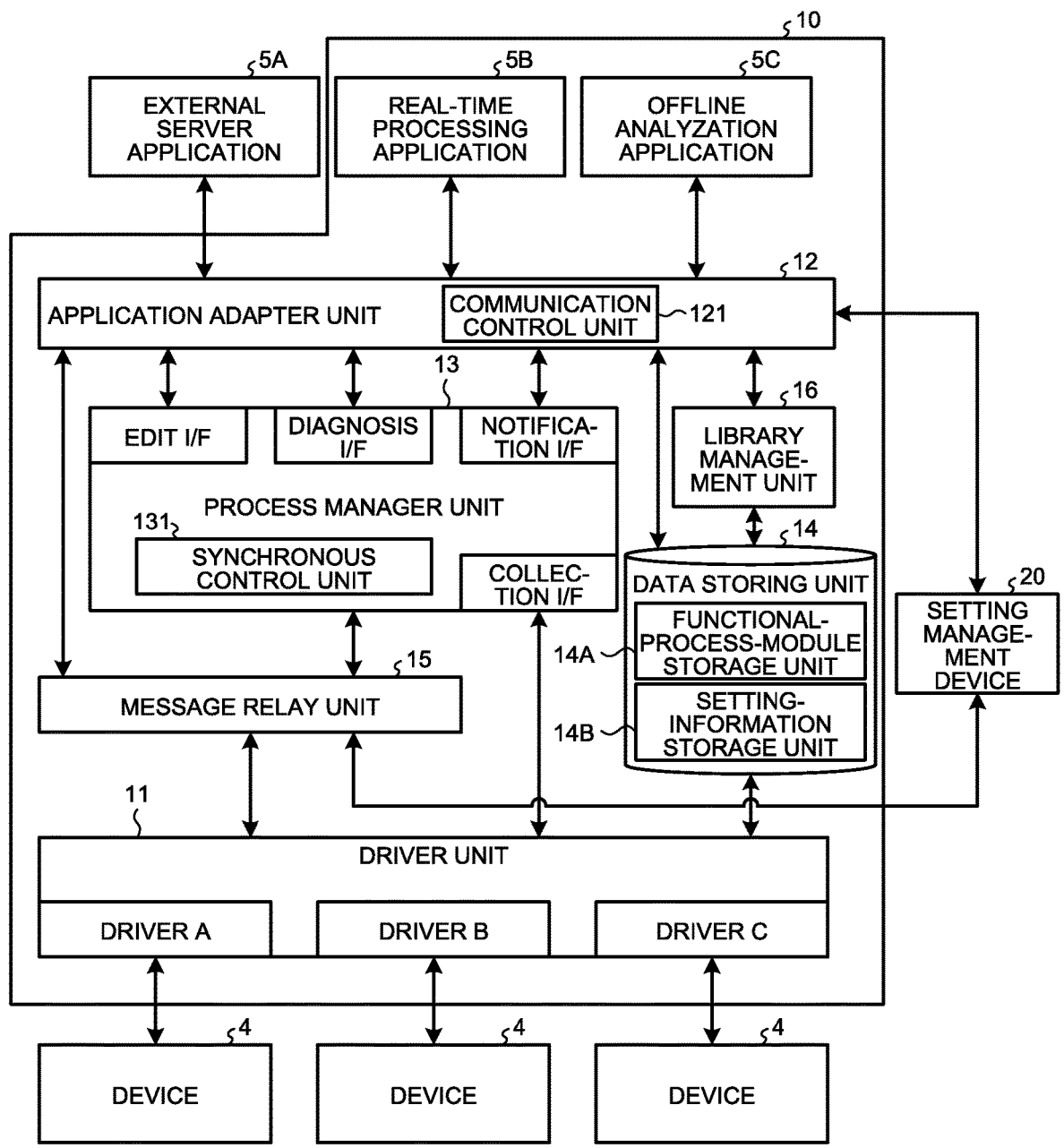
FIG. 3 is a diagram illustrating a configuration of a data processing device illustrated in FIG. 1.

FIG. 3 is a diagram illustrating a configuration of the data processing device illustrated in FIG. 1. The data processing device 10 includes a real-time processing application 5B, an offline analyzation application 5C, a driver unit 11, an application adapter unit 12, a process manager unit 13, a data storing unit 14, a message relay unit 15, and a library management unit 16. Further, the data processing device 10 is connected to an external server (not illustrated) such as a cloud server that stores therein an external server application 5A. The data storing unit 14 includes a functional-process-module storage unit 14A that stores therein a functional process module, and a setting-information storage unit 14B that stores therein setting information.

The data processing device 10 is connectable to a plurality of devices 4. The data processing device 10 has extensibility for the device 4 and the device 4 to be connected can be added later to the data processing device 10 in addition to the device 4 that has been set in advance. While FIG. 3 illustrates three types of devices 4, four or more types of devices 4 may be connected to the data processing device 10 or a plurality of devices 4 of the same type may be connected to the data processing device 10.

In addition to pre-installed application software (hereinafter, simply referred to as "application") 5, the application 5 desired by a user can be added or changed later in the data processing device 10. The application 5 is constructed from a plurality of functional process modules such as an edit module for performing an industrial-data edit process, a diagnosis module for performing an industrial-data diagnosis process, and a notification module for performing a diagnosis-result notification process. For example, the functional process module is an EXEcutable file.

Examples of the application 5 to be used by the data processing device 10 include the external server application 5A that is executed by an external server and returns an execution result to the data processing device 10, the real-time processing application 5B that returns a processing result to the data processing device 10 in real time, and the offline analyzation application 5C that can analyze the processing result offline. Among these applications, the real-time processing application 5B is an application to be executed by the process manager unit 13 as so-called "streaming processing" in which input data is executed simultaneously with a functional process. The offline analyzation application 5C is an application to be executed by the process manager unit 13 using industrial data stored in the data storing unit 14 independently from the streaming processing described above. The external server application 5A can be any application to be executed by the external server and may be a real-time processing application or an offline analyzation application.

The external server application 5A, the real-time processing application 5B, and the offline analyzation application 5C can perform a functional process such as an edit process, a diagnosis process, and a diagnosis-result notification process. The combination of an OS environment to execute the application 5 and the function of the application 5 is not particularly limited. That is, for example, it is permissible that (1) the real-time processing application 5B performs all of the edit process, the diagnosis process, and the diagnosis-result notification process, (2) the external server application 5A performs the edit process, the real-time processing application 5B performs the diagnosis process, and the offline analyzation application 5C performs the notification process, or (3) the real-time processing application 5B performs the edit process and the diagnosis process, while the offline analyzation application 5C performs the notification process.

When a setting management device 20 described below sets the process sequence for the edit process, the diagnosis process, and the notification process of the application 5, the data processing device 10 sequentially performs the series of the functional processes in the set sequence. As a specific example, (1) the data processing device 10 sequentially performs the edit process, the diagnosis process, and the notification process of the real-time processing application 5B, (2) the data processing device 10 performs the edit process of the external server application 5A, then sequentially performs the diagnosis process of the real-time processing application 5B, and sequentially performs the notification process of the offline analyzation application 5C, or (3) the data processing device 10 sequentially performs the edit process and the diagnosis process of the real-time processing application 5B, and then performs the notification process of the offline analyzation application 5C. In the descriptions herein of the processing in the data processing device 10, for the sake of convenience, a functional process is assumed to be performed on, for example, one frame of industrial data (hereinafter, industrial data is counted on the basis of the number of frames). However, it is also permissible that the process manager unit 13 performs the edit process three times on three frames of industrial data, and thereafter performs the diagnosis process three times on the three frames. That is, it is unnecessary for the process manager unit 13 to first complete all the functional processes on an initial frame of industrial data, such as performing the edit process and then the diagnosis process on the initial frame, before the start of functional processes on the next frame of industrial data.

The driver unit 11 performs a process of connecting to plural types of devices 4. Specifically, on the basis of a protocol supported by the connected device 4, the driver unit 11 converts the data format of input data to the device 4 and output data from the device 4. When the driver unit 11 receives an industrial-data obtaining instruction message output from the process manager unit 13 that controls the driver unit 11 via the message relay unit 15, then the driver unit 11 converts the received industrial-data obtaining instruction message to an instruction message in accordance with the protocol that can be supported by the device 4, and then outputs the converted instruction message to the device 4. The device 4 then collects industrial data on the basis of the received instruction message, and outputs the collected industrial data to the driver unit 11. The driver unit 11 edits industrial data output from each of the devices 4 into a format in conformity with a preset collection interface of the process manager unit 13, and then transfers the edited output data to the process manager unit 13. That is, between the devices 4 and the process manager unit 13, the driver unit 11 absorbs the difference in protocol for each device 4.

The application adapter unit 12 is configured to perform data communication with the application 5 (5A, 5B, and 5C) and the process manager unit 13, and includes a communication control unit 121 that controls this data communication. For example, the communication control unit 121 transmits industrial data output from the process manager unit 13 to the application 5, or it transmits data output by execution of the application 5 to another application. Further, on the basis of the input/output information (FIG. 4), the application adapter unit 12 performs control such that input data to the application 5 is converted into a format that complies with a protocol supported by the application 5 that is an input destination and the converted input data is input to the same application 5.

Figures 4, 5:
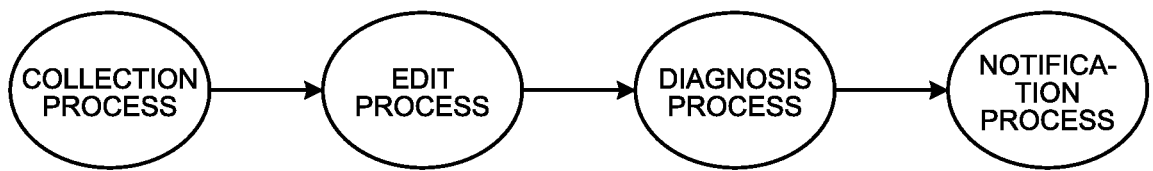
FIG. 4 is a diagram illustrating an example of input/output information stored in the data processing device illustrated in FIG. 3.
FIG. 5 is a diagram illustrating an example of a series of functional processes to be performed by the data processing device illustrated in FIG. 3 on the basis of setting information.

FIG. 4 is a diagram illustrating an example of input/output information stored in the data processing device 10 illustrated in FIG. 3. Input/output information 31 is stored in the data storing unit 14. For example, the input/output information 31 includes application identification information for identifying the application 5 and protocol information for identifying a protocol associated with the application 5. That is, the input/output information 31 is information used for identifying a protocol by which the application 5 can be executed. The input/output information 31 indicates a protocol supported by the application 5. However, the input/output information 31 may also indicate a data format itself in place of the protocol. Examples of the standards, such as a protocol supported by the application adapter unit 12, include Message Queuing Telemetry Transport (MQTT), REpresentational State Transfer (REST), Dynamic Link Library (DLL), OLE for Process Control Unified Architecture (OPC UA), and file access protocol.

The application adapter unit 12 can use the input/output information 31 to convert input data to and output data from the process performed by the application 5. More specifically, when the process manager unit 13 executes an application #1, the application adapter unit 12 converts input data to be handled by the application #1 into a data format defined by a protocol #1 associated with the application #1 in accordance with the input/output information 31. The application adapter unit 12 converts the data format of output data from the executed application 5 in accordance with a preset interface of the process manager unit 13.

Specifically, in a case where the application 5 performs the edit process, the application adapter unit 12 converts the data format of output data in accordance with an edit interface of the process manager unit 13. In a case where the application 5 performs the diagnosis process, the application adapter unit 12 converts the data format of output data in accordance with a diagnosis interface of the process manager unit 13. In a case where the application 5 performs the notification process, the application adapter unit 12 converts the data format of output data in accordance with a notification interface of the process manager unit 13.

The process manager unit 13 collects industrial data from the device 4 via the driver unit 11 and executes functional process modules (edit, diagnosis, and notification) in the application 5 via the application adapter unit 12 to thereby perform functional processes such as an industrial-data collection process, an edit process, a diagnosis process, and a diagnosis-result notification process. That is, by instructing the driver unit 11 to obtain industrial data, the process manager unit 13 can collect industrial data. Sequentially, by transmitting the collected industrial data as input data to the application adapter unit 12 and instructing the functional process modules in the application 5 to be executed via the application adapter unit 12, the process manager unit 13 can perform the functional processes on the industrial data.

While the process manager unit 13 collects industrial data from the device 4 via the driver unit 11, the process manager unit 13 may also collect industrial data mechanically collected by the device 4 as needed. Alternatively, the device 4 may hold therein a collection module that collects industrial data and execute this collection module so that the process manager unit 13 collects the industrial data. Alternatively, the data processing device 10 itself may include a collection module and execute this collection module so that the process manager unit 13 collects industrial data.

The process manager unit 13 has a function of a synchronous control unit 131 that synchronizes data communication between a plurality of functional process modules each of which performs a corresponding functional process. On the basis of setting information described below, the synchronous control unit 131 controls the execution sequence of a plurality of functional process modules, that is, the sequence of a series of functional processes to synchronize data communication between the functional process modules. The synchronous control unit 131 smoothly and sequentially provides instructions to execute the functional process modules in accordance with the sequence set in the setting information to thereby perform a plurality of functional processes continuously in time without interruption. The term "synchronize" refers to adjustment of a timing to execute a functional process module and a timing to cause the functional process module to execute input data. For example, in a case of performing a diagnosis process that is a process subsequent to an edit process, the process manager unit 13 uses the output of edited data (output data) by the edit process as a trigger to perform the diagnosis process, thereby synchronizing the diagnosis process with the edit process. The process manager unit 13 may also synchronize the diagnosis process with the edit process by performing the diagnosis process after a lapse of a predetermined period from the edit process.

FIG. 5 is a diagram illustrating an example of a series of functional processes to be performed by the data processing device 10 illustrated in FIG. 3 on the basis of setting information. An arrow connecting between two functional processes indicates that output data of the preceding functional process becomes input data of the subsequent functional process. The series of functional processes illustrated in FIG. 5 includes a collection process, an edit process, a diagnosis process, and a notification process. After the collection process, the edit process of editing industrial data obtained by the collection process is performed, then the diagnosis process is performed using output data that is the edited industrial data, and then the notification process of issuing a notification of a diagnosis result of the diagnosis process is performed. The setting information indicates the procedure of the functional processes as illustrated in FIG. 5 to handle industrial data or industrial data after having undergone the functional processes. Specifically, as illustrated in FIG. 6, the setting information includes sequence information indicating the execution sequence of a plurality of functional processes, process type information indicating the category of each functional process, process method information for identifying the device 4 used for performing each functional process or identifying a functional process module included in the application 5, and input data information for identifying the type of input data on which the application 5 performs a functional process.

Further, in a case of executing a functional process module and performing a functional process on input data handled by the functional process module on the basis of the setting information, the data processing device 10 needs to convert the input data into a data format in accordance with a protocol that can be supported by the functional process module. For this reason, the application adapter unit 12 converts the input data into a data format in accordance with a protocol that can be supported by the functional process module on the basis of the input/output information illustrated in FIG. 4 and prepared separately from the setting information. In the embodiment described above, separate data sheets of the setting information and the input/output information are stored in the data storing unit 14. In the present embodiment, the setting information and the input/output information may be combined into a single data sheet and stored in the data storing unit 14.

Figures 6, 7:
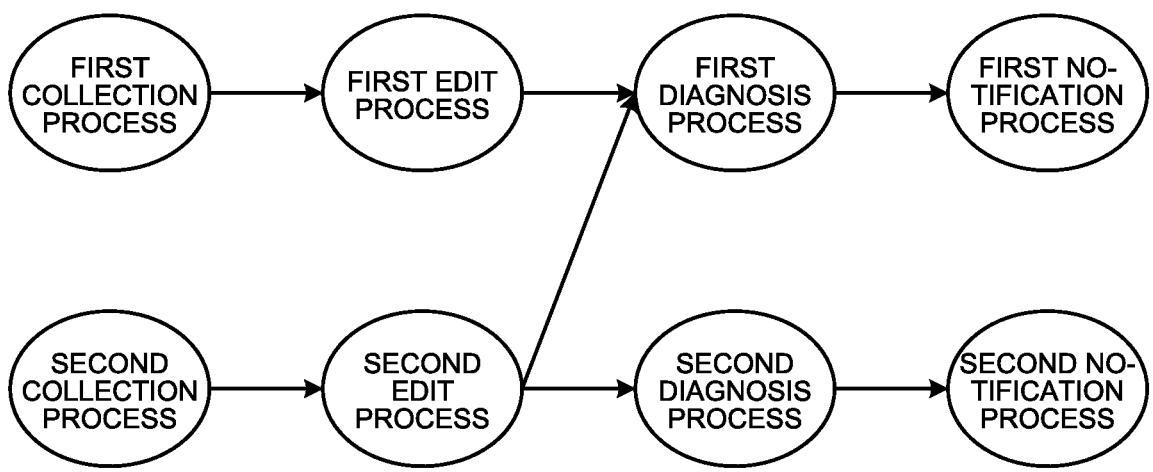
FIG. 6 is a diagram illustrating an example of setting information used by the data processing device illustrated in FIG. 3.
FIG. 7 is a diagram illustrating another example of a series of functional processes to be performed by the data processing device illustrated in FIG. 3.

FIG. 7 is a diagram illustrating another example of a series of functional processes to be performed by the data processing device illustrated in FIG. 3. The data processing device 10 can perform a series of functional processes illustrated in FIG. 7 instead of the series of functional processes illustrated in FIG. 5 by rewriting the setting information by the setting management device 20 described below. As illustrated in FIG. 7, a series of functional processes may include a plurality of functional processes that are performed simultaneously or include a functional process of receiving two frames of input data. The series of functional processes illustrated in FIG. 7 includes a first collection process, a second collection process, a first edit process, a second edit process, a first diagnosis process, a second diagnosis process, a first notification process, and a second notification process. As illustrated in FIG. 7, after the first collection process, the first edit process of editing industrial data obtained by the first collection process is performed, and after the second collection process, the second edit process of editing industrial data obtained by the second collection process is performed. As illustrated in FIG. 7, after the first edit process and the second edit process, the first diagnosis process is performed using the industrial data edited by the first edit process and the industrial data edited by the second edit process, and after the second edit process, the second diagnosis process is performed using the industrial data edited by the second edit process. After the first diagnosis process, the first notification process of issuing a notification of the diagnosis result of the first diagnosis process is performed. After the second diagnosis process, the second notification process of issuing a notification of the diagnosis result of the second diagnosis process is performed.

For example, in a case of a setting in which it is sufficient if the first collection process ends before the first edit process starts, the data processing device 10 may perform the first collection process multiple times, and thereafter perform the first edit process. That is, while the data processing device 10 performs a series of functional processes on the basis of the setting information, the series of functional processes is performed in sequence on one piece of industrial data, for example, one frame of industrial data. For this reason, in a case where the data processing device 10 performs the first collection process multiple times and thereafter performs the first edit process as described above, the data processing device 10 needs to transfer the industrial data collected by the initial first collection process to the first edit process. Accordingly, in the present embodiment, this operation is accommodated by time-stamping the industrial data, which is described below in detail.

When the process manager unit 13 instructs the driver unit 11 to obtain industrial data 33 described below in accordance with setting information, the driver unit 11 outputs the industrial data 33 converted into a data format in conformity with the collection interface of the process manager unit 13. The process manager unit 13 adds, to the industrial data 33, a time stamp 32 that is data-obtaining time information indicating the date and time at which the industrial data 33 is obtained. The process manager unit 13 stores the industrial data 33 to which the time stamp 32 is added as time-stamped industrial data in the data storing unit 14. The process manager unit 13 has a correspondence table stored therein, which indicates a memory area where each time-stamped industrial data is stored. In accordance with this correspondence table, the process manager unit 13 can store time-stamped industrial data in a preset memory area. While a time stamp is used in the present embodiment, it is sufficient if it is information that can identify the sequence in which the process manager unit 13 has obtained the industrial data, i.e., data-obtaining sequence identification information. For example, a numerical counter value obtained by a counter counting numerical values in sequence may be used.

Figures 8, 9:
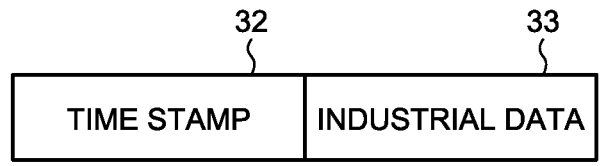
FIG. 8 is a diagram illustrating a correspondence table between a device and a memory area, stored in the data processing device illustrated in FIG. 3.
FIG. 9 is a diagram illustrating time-stamped industrial data stored in the data processing device illustrated in FIG. 3.

FIG. 8 is a diagram illustrating a correspondence table between a device and a memory area, stored in the data processing device 10. For example, the correspondence table includes device information for identifying a device from which the industrial data 33 included in time-stamped industrial data has been obtained, and memory area information for identifying a memory area where time-stamped industrial data is stored. For example, when the process manager unit 13 receives the industrial data 33 obtained by using a device #1, the process manager unit 13 identifies a memory area D1 associated with the device #1 in accordance with this correspondence table. The process manager unit 13 then stores time-stamped industrial data, in which the time stamp 32 is added to the received industrial data 33, in the memory area D1.

FIG. 9 is a diagram illustrating time-stamped industrial data stored in the data processing device 10. This time-stamped industrial data includes the time stamp 32 and the industrial data 33. It is sufficient if the time stamp 32 is information that can be used to objectively determine the sequence in which the industrial data 33 has been obtained. For example, the time stamp 32 may indicate the date and time at which the process manager unit 13 provides instructions to obtain the industrial data 33, or it may indicate the date and time at which the process manager unit 13 receives the industrial data 33 via the driver unit 11. The application 5 that is executed by the process manager unit 13 changes, in accordance with the result of a functional process, the details of only the industrial data 33 within the industrial data 33 to which the time stamp 32 is added, and does not change the date of the time stamp 32. With this operation, the process manager unit 13 can perform processing on the basis of the time at which the industrial data 33 is obtained through a plurality of functional processes. In the edit process for example, in a case where the date and time is not replaced by the date and time at which the industrial data 33 is edited, the time stamp 32 still indicates the date and time at which the industrial data 33 is obtained even after the edit process.

After having added the time stamp 32 to the obtained industrial data 33, the process manager unit 13 inputs time-stamped industrial data to a functional process module of the application 5. The application 5 then performs a series of functional processes while the time indicated by the time stamp 32 remains fixed in the time-stamped industrial data; therefore, the process manager unit 13 can synchronize the industrial data to which the same time is added, i.e., input data, between the functional process modules. The same time does not necessarily mean exactly matching times, and a time difference within a predetermined range is permissible. Because the same time includes a time with a difference within a predetermined range, a plurality of times within a predetermined range are also collectively referred to as "same time". Specifically, a plurality of frames of industrial data to which a time stamp is added, indicating different times within a predetermined range, are referred to as "industrial data at the same time".

In the present embodiment, the process manager unit 13 adds the time stamp 32 to the industrial data 33. The driver unit 11 may add the time stamp 32 to the industrial data 33. With this operation, the time stamp 32 can be added to the industrial data 33 at the point in time when the data processing device 10 obtains the industrial data 33 from the device 4.

The process manager unit 13 repeats a series of functional processes. At this time, it is permissible that the process manager unit 13 does not wait for a series of functional processes on the industrial data 33 collected at a time t to be completed, for example, does not wait for notification in the notification process, but collects the industrial data 33 at a next time t+m by parallel processing. With this operation, there are a plurality of frames of industrial data 33, a plurality of frames of edited data, and a plurality of diagnosis results. In a case of performing the series of functional processes illustrated in FIG. 5, the process manager unit 13 instructs the driver unit 11 or the application 5 to perform each of the functional processes in such a manner that the collection process, the edit process, the diagnosis process, and the notification process, which are included in the series of functional processes, are performed continuously in time. At this time, in the process manager unit 13, input data to be handled in each functional process included in a series of functional processes is assumed as data including the time stamp 32 that indicates the same time. With this data, even in a case where parallel processing is performed, a plurality of functional processes included in a series of functional processes can process the industrial data 33 obtained at the same timing. That is, the time stamp 32 is used to select input data to be handled in the functional processes; therefore, several series of functional processes can be performed in parallel with each other. Thus, the entire processing time can be reduced as compared to a case where a series of functional processes ends and then the next series of functional processes is performed.

In a case of performing the series of functional processes illustrated in FIG. 7, the process manager unit 13 causes the first collection process and the second collection process to be performed at the same timing. The process manager unit 13 can use the time stamp 32 to cause data based on first industrial data obtained by the first collection process to be handled in the first edit process, the first diagnosis process, and the first notification process, and cause data based on second industrial data obtained by the second collection process to be handled in the second edit process, the second diagnosis process, the second notification process, the first diagnosis process, and the first notification process. With this configuration, in the first diagnosis process, first edited data obtained by editing the first industrial data by the first edit process, and second edited data obtained by editing, by the second edit process, the second industrial data obtained at the same timing as the first industrial data are handled. Data to be handled in each functional process is identified by using the time stamp 32 added to the industrial data 33 as described above. Accordingly, in a case, for example, where the second edit process ends earlier than the first edit process, the process manager unit 13 can perform parallel processing by causing the second diagnosis process and the second notification process to be performed without waiting for the first edit process to end. In a case where in the first diagnosis process, a process can be started using the second edited data without using the first edited data, the process manager unit 13 can perform parallel processing by starting the first diagnosis process without waiting for the first edit process to end. The process manager unit 13 may also perform the first collection process and the second collection process multiple times and thereafter perform the subsequent functional processes.

The descriptions return to FIG. 3. While the process manager unit 13 executes the real-time processing application 5B and performs real-time processing using the industrial data 33, the data storing unit 14 temporarily stores therein input/output data between functional process modules, for example, input/output data between the edit process module and the diagnosis process module. In a case of performing offline processing using the input/output data described above, the process manager unit 13 executes the offline analyzation application 5C and performs, for example, the diagnosis process using the input/output data stored in the data storing unit 14.

The message relay unit 15 relays a message between respective constituent elements such as the driver unit 11, the application adapter unit 12, and the process manager unit 13.

The library management unit 16 manages the basic processes having been set in advance as a library. Each application 5 can refer to the library as needed. When the application 5 requests the library management unit 16 to perform a process provided by the library, the library management unit 16 can return the process result to the application 5 in response to the request from the application 5.

Figure 10:
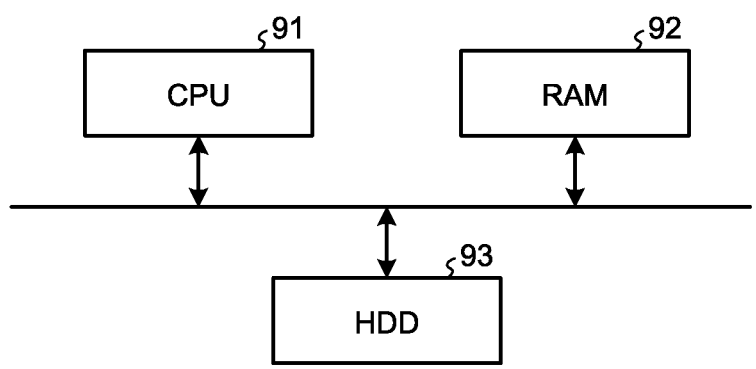
FIG. 10 is a diagram illustrating a hardware configuration of the data processing device illustrated in FIG. 3.

FIG. 10 is a diagram illustrating a hardware configuration of the data processing device 10. The data processing device 10 can be implemented by using a central processing unit (CPU) 91, a random access memory (RAM) 92, and a hard disk drive (HDD) 93.

The functions of the driver unit 11, the application adapter unit 12, the process manager unit 13, the message relay unit 15, and the library management unit 16 in the data processing device 10 are implemented by the CPU 91 executing computer programs stored in the HDD 93 while using the RAM 92 as a workspace. The function of the data storing unit 14 is implemented by using storage devices such as the RAM 92 and the HDD 93.

That is, the data processing device 10 stores, in the HDD 93 of the data storing unit 14, computer programs for implementing the application adapter unit 12, the process manager unit 13, the driver unit 11, and other units illustrated in FIG. 3, the application 5 (the real-time processing application 5B and the offline analyzation application 5C), setting information, input/output information, and the like. In the data processing device 10, the CPU 91 is configured to load necessary computer programs and application 5 in the RAM 92 and uses the RAM 92 as a workspace to perform a functional process on the input/output data using the setting information and the input/output information. In the present embodiment, although the process manager unit 13 executes a functional process module, the CPU 91 that serves as the process manager unit 13 is configured to execute the functional process module in practice.

The hardware configuration described above is a mere example. It is permissible that the data processing device 10 is implemented by using a processing circuit other than the CPU 91 or by using storage devices other than the RAM 92 and the HDD 93.

Figure 11:
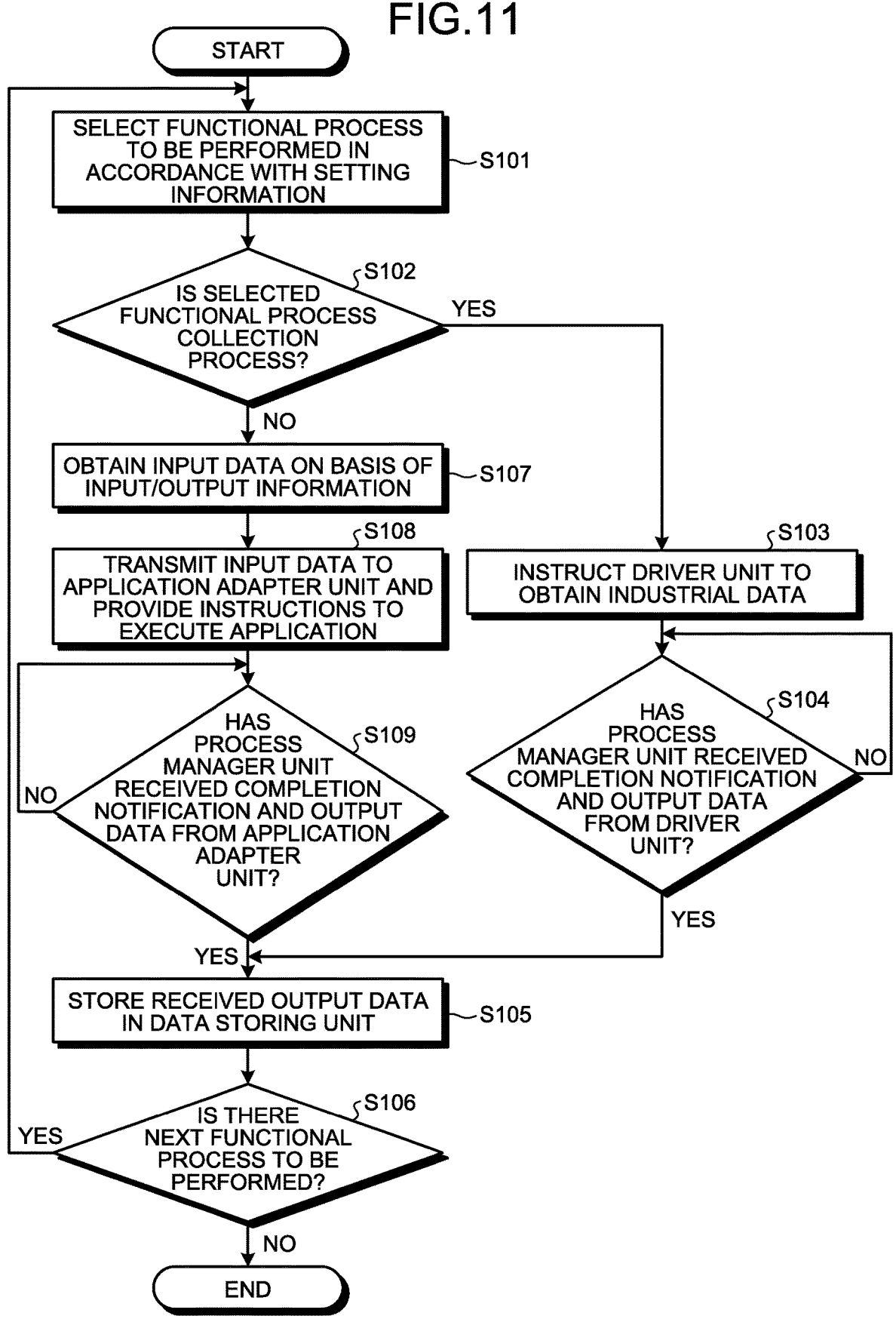
FIG. 11 is a flowchart illustrating an operation of a process manager unit illustrated in FIG. 3.

FIG. 11 is a flowchart illustrating an operation of the process manager unit 13. The process manager unit 13 selects a functional process to be performed on the basis of setting information (Step S101). Next, the process manager unit 13 determines whether the functional process selected at Step S101 is a collection process (Step S102). When the selected functional process is a collection process (YES at Step S102), the process manager unit 13 transmits to the driver unit 11 information identifying the device 4 to be connected to the data processing device 10, and instructs the driver unit 11 to obtain the industrial data 33 (Step S103). The driver unit 11 having received the instructions obtains the industrial data 33 from the device 4 identified by the information received from the process manager unit 13, converts the obtained industrial data 33 into a data format in conformity with the collection interface of the process manager unit 13, and thereafter transmits the converted industrial data 33 as output data along with a completion notification to the process manager unit 13.

The process manager unit 13 determines whether the process manager unit 13 has received a completion notification of the collection process and output data collected by the device 4 from the driver unit 11 (Step S104). When the process manager unit 13 determines that the process manager unit 13 has not yet received the completion notification and the output data (NO at Step S104), the process manager unit 13 repeats the determination of Step S104 until the process manager unit 13 receives the completion notification and the output data. When the process manager unit 13 determines that the process manager unit 13 has received the completion notification and the output data (YES at Step S104), the process manager unit 13 stores the received output data in the data storing unit 14 (Step S105). The process manager unit 13 then determines whether there is a next functional process to be performed on the basis of the setting information (Step S106). When there is not the next functional process to be performed (NO at Step S106), the process manager unit 13 ends a series of functional processes. When there is the next functional process to be performed (YES at Step S106), the process manager unit 13 repeats the processing from Step S101.

When the functional process selected at Step S101 is not a collection process (NO at Step S102), that is, when the functional process selected at Step S101 is an edit process, a diagnosis process, or a notification process, the process manager unit 13 obtains input data to be handled in the functional process performed by a selected application 5 on the basis of input/output information included in the setting information and a time stamp (Step S107). The process manager unit 13 transmits the obtained input data to the application adapter unit 12, and instructs the application adapter unit 12 to execute the selected application 5 (Step S108). Specifically, the process manager unit 13 transmits, to the application adapter unit 12, information for identifying the selected application 5 and input data input to the functional process performed by the selected application 5. When the application adapter unit 12 having received the instructions completes a process described below, the application adapter unit 12 transfers a completion notification indicating completion of this process and output data that is an execution result of the functional process module to the process manager unit 13.

The process manager unit 13 determines whether the process manager unit 13 has received the completion notification and the output data from the application adapter unit 12 (Step S109). When the process manager unit 13 determines that the process manager unit 13 has not yet received the completion notification and the output data (NO at Step S109), the process manager unit 13 repeats the determination of Step S109 until the process manager unit 13 receives the completion notification and the output data. When the process manager unit 13 determines that the process manager unit 13 has received the completion notification and the output data (YES at Step S109), the process manager unit 13 advances to the processing of Step S105. The process manager unit 13 can repeat a series of functional processes illustrated in FIG. 11 at a predetermined time interval.

Figure 12:
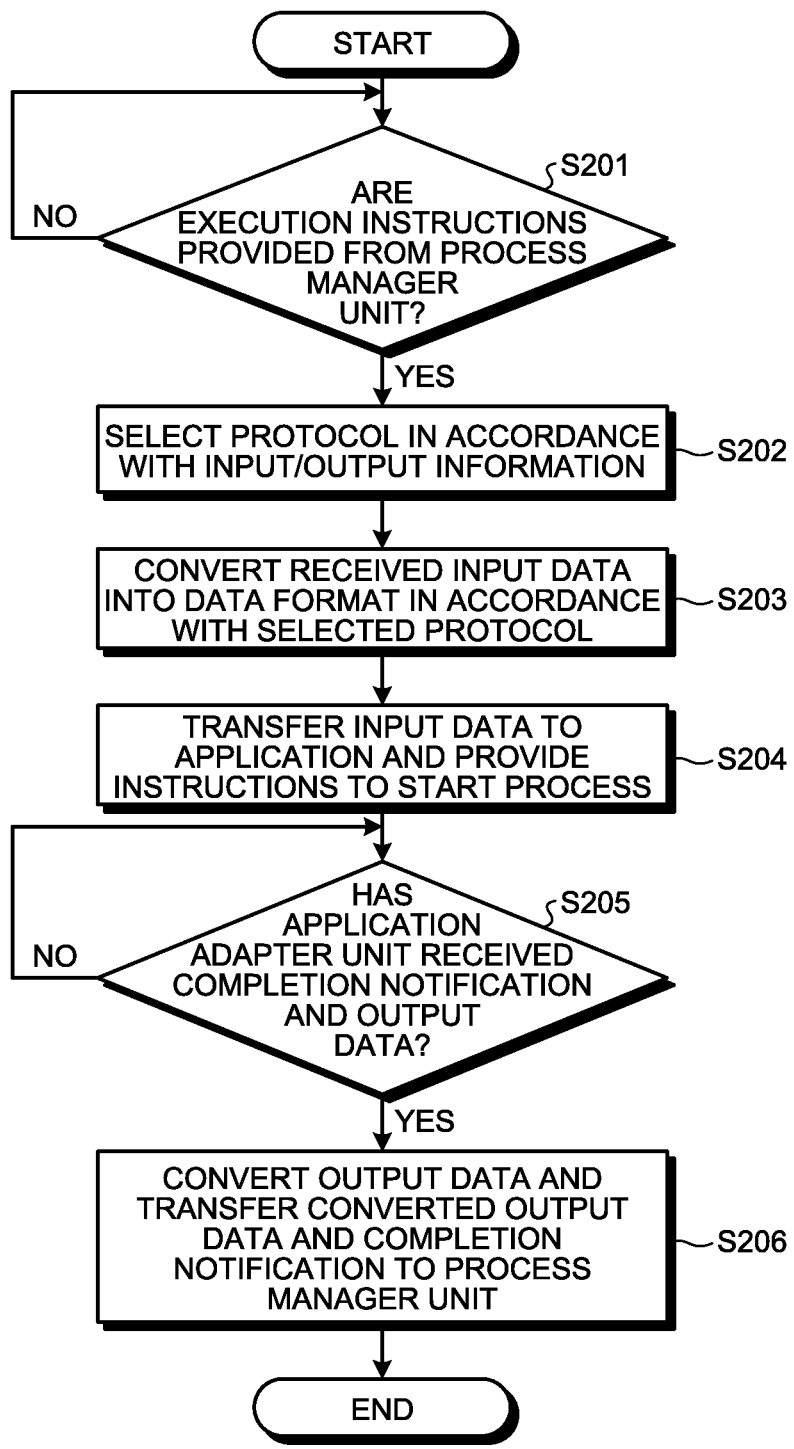
FIG. 12 is a flowchart illustrating an operation of an application adapter unit illustrated in FIG. 3.

FIG. 12 is a flowchart illustrating an operation of the application adapter unit 12 illustrated in FIG. 3. The application adapter unit 12 determines whether execution instructions are provided from the process manager unit 13 (Step S201). When the application adapter unit 12 determines that execution instructions are not provided from the process manager unit 13 (NO at Step S201), the application adapter unit 12 is on standby by repeating the determination of Step S201 until execution instructions are provided from the process manager unit 13. When the application adapter unit 12 determines that execution instructions are provided from the process manager unit 13 (YES at Step S201), the application adapter unit 12 selects a protocol supported by the application 5 indicated by the execution instructions in accordance with input/output information (Step S202). The application adapter unit 12 receives input data transmitted along with the execution instructions from the process manager unit 13, and then converts the received input data into a format in accordance with the selected protocol (Step S203).

The application adapter unit 12 transmits the converted input data to the application 5, and instructs the application 5 to start the process to thereby execute the application 5 (Step S204). The application adapter unit 12 determines whether the application adapter unit 12 has received a completion notification and output data from the application 5 (Step S205). When the application adapter unit 12 determines that the application adapter unit 12 has not yet received the completion notification and the output data (NO at Step S205), the application adapter unit 12 is on standby by repeating the determination of Step S205 until the application adapter unit 12 receives the completion notification and the output data. When the application adapter unit 12 has received the completion notification and the output data (YES at Step S205), the application adapter unit 12 converts the received output data into a predetermined data format in conformity with the interface of the process manager unit 13, and transmits the converted output data and the completion notification to the process manager unit 13 (Step S206). The application adapter unit 12 is on standby until execution instructions are provided from the process manager unit 13. The application adapter unit 12 repeats the operation illustrated in FIG. 12 each time the application adapter unit 12 receives execution instructions from the process manager unit 13.

Figure 13:
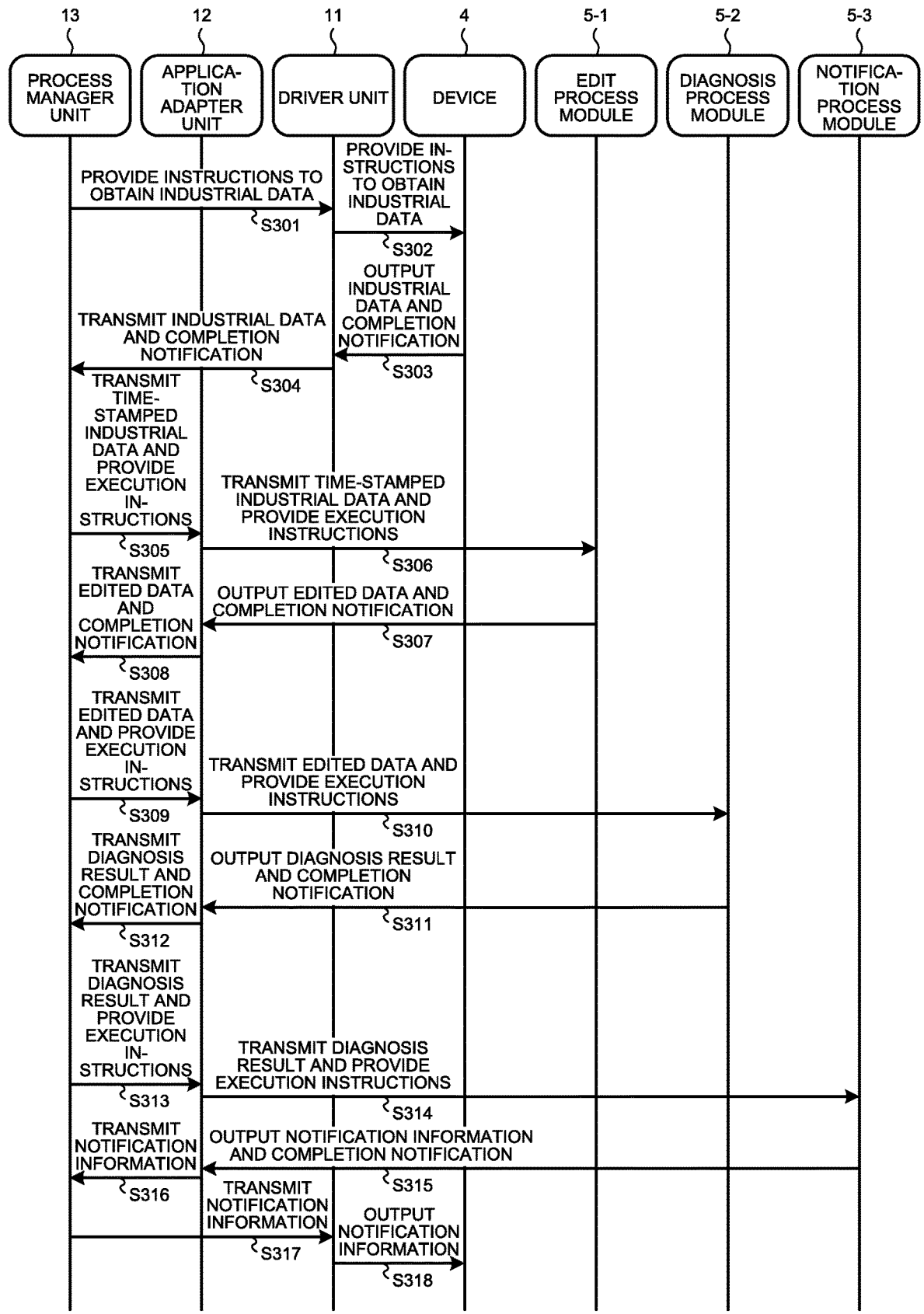
FIG. 13 is a sequence diagram illustrating an operation example when the data processing system illustrated in FIG. 1 performs a series of functional processes illustrated in FIG. 5.

FIG. 13 is a sequence diagram illustrating an operation example when the data processing system illustrated in FIG. 1 performs the series of functional processes illustrated in FIG. 5. This sequence diagram omits illustrations of details on the processing to be performed by each constituent element for the sake of simplicity, and mainly illustrates information received and transmitted between the constituent elements.

First, the process manager unit 13 performs a collection process on the basis of setting information describing the series of functional processes illustrated in FIG. 5. The process manager unit 13 checks which of the devices 4 is used for the collection process from the setting information, and transmits information identifying the device 4 to the driver unit 11 to instruct the driver unit 11 to obtain the industrial data 33 (Step S301). In this example, the process manager unit 13 is assumed to have instructed the driver unit 11 to cause the device 4 to obtain the industrial data 33. In response to the instructions from the process manager unit 13, the driver unit 11 converts the data-obtaining instructions that are input data to the device 4 into a data format in conformity with the device 4, and inputs the converted data-obtaining instructions to the device 4 (Step S302).

In response to the data-obtaining instructions from the driver unit 11, the device 4 obtains the industrial data 33 and outputs the obtained industrial data 33 and a completion notification to the driver unit 11 (S303). The driver unit 11 converts the industrial data 33 output by the device 4 into a format in conformity with the collection interface of the process manager unit 13, and transmits the converted industrial data 33 and the completion notification to the process manager unit 13 (Step S304).

When the process manager unit 13 receives the industrial data 33 and the completion notification, the process manager unit 13 generates time-stamped industrial data that is the industrial data 33 to which a time stamp is added, and stores the generated time-stamped industrial data in the data storing unit 14. The process manager unit 13 determines whether there is a next process to be performed on the basis of the setting information. In this example, because the next process is an edit process, the process manager unit 13 identifies an edit process module 5-1 as the application 5 to be used for performing the edit process on the basis of the setting information. The process manager unit 13 then obtains input data to the edit process that is performed by the edit process module 5-1 from among frames of time-stamped industrial data stored in the data storing unit 14 on the basis of the setting information. The process manager unit 13 transmits time-stamped industrial data as input data to the edit process that is performed by the edit process module 5-1, and also instructs the application adapter unit 12 to execute this application 5 (Step S305).

On the basis of input/output information, the application adapter unit 12 checks a protocol supported by the edit process module 5-1 that is the application 5 to be executed by the instructions, and converts time-stamped industrial data that is input data received from the process manager unit 13 into a data format in accordance with this protocol. The application adapter unit 12 then transmits the converted time-stamped industrial data as input data, and also instructs the edit process module 5-1 to perform the edit process (Step S306).

When the edit process module 5-1 receives the time-stamped industrial data and the execution instructions from the application adapter unit 12, the edit process module 5-1 edits the time-stamped industrial data received as input data in a predetermined manner, and outputs the edited data that is the edited time-stamped industrial data as output data. The edit process module 5-1 outputs a completion notification along with the edited data to the application adapter unit 12 (Step S307).

When the application adapter unit 12 receives the edited data and the completion notification from the edit process module 5-1, the application adapter unit 12 converts the edit data into a data format in conformity with the edit interface of the process manager unit 13, and transfers the converted edit data along with the completion notification to the process manager unit 13 (Step S308).

When the process manager unit 13 receives the edited data and the completion notification, the process manager unit 13 stores the received edited data in the data storing unit 14 and determines whether there is a next process to be performed on the basis of the setting information. In this example, because the next process is a diagnosis process, the process manager unit 13 identifies a diagnosis process module 5-2 as the application 5 to be used for performing the diagnosis process on the basis of the setting information. The process manager unit 13 then obtains input data to be handled in the diagnosis process that is performed by the diagnosis process module 5-2 on the basis of the setting information. In this example, the process manager unit 13 obtains the edited data as input data. The process manager unit 13 instructs the application adapter unit 12 to transfer the edited data to the diagnosis process module 5-2 and execute this application 5 (Step S309).

On the basis of the input/output information, the application adapter unit 12 checks a protocol supported by the diagnosis process module 5-2 that is the application 5 to be executed by the instructions, and converts the edited data received from the process manager unit 13 into a data format in accordance with this protocol. The application adapter unit 12 transfers the converted edited data to the diagnosis process module 5-2, and also instructs the diagnosis process module 5-2 to perform the diagnosis process (S310).

When the diagnosis process module 5-2 receives the edited data and the execution instructions from the application adapter unit 12, the diagnosis process module 5-2 diagnoses the received edited data and outputs the diagnosis result as output data. The diagnosis process module 5-2 outputs a completion notification along with the diagnosis result to the application adapter unit 12 (Step S311).

When the application adapter unit 12 receives the diagnosis result and the completion notification from the diagnosis process module 5-2, the application adapter unit 12 converts the diagnosis result into a data format in conformity with the diagnosis interface of the process manager unit 13, and transfers the converted diagnosis result along with the completion notification to the process manager unit 13 (Step S312).

When the process manager unit 13 receives the diagnosis result and the completion notification, the process manager unit 13 stores the received diagnosis result in the data storing unit 14 and determines whether there is a next process to be performed on the basis of the setting information. In this example, because the next process is a notification process, the process manager unit 13 identifies a notification process module 5-3 as the application 5 to be used for performing the notification process on the basis of the setting information. The process manager unit 13 obtains input data to be handled in the notification process that is performed by the notification process module 5-3 on the basis of the setting information. In this example, the process manager unit 13 obtains the diagnosis result as input data. The process manager unit 13 instructs the application adapter unit 12 to transfer the diagnosis result to the notification process module 5-3 and execute this application 5 (Step S313).

On the basis of the input/output information, the application adapter unit 12 checks a protocol supported by the notification process module 5-3 that is the application 5 to be executed by the instructions, and converts the diagnosis result that is input data received from the process manager unit 13 into a data format in accordance with this protocol. The application adapter unit 12 then transmits the converted diagnosis result to the notification process module 5-3, and also instructs the notification process module 5-3 to perform the notification process (S314).

When the notification process module 5-3 receives the diagnosis result and the execution instructions from the application adapter unit 12, the notification process module 5-3 determines whether to issue a notification of the received diagnosis result. When the notification process module 5-3 determines to issue a notification of the received diagnosis result, the notification process module 5-3 determines a notification destination. In this example, the device 4 is notified of the diagnosis result. The notification process module 5-3 generates notification information indicating whether to perform notification and the notification destination, and outputs the notification information as output data. The notification process module 5-3 outputs a completion notification along with the notification information to the application adapter unit 12 (Step S315).

When the application adapter unit 12 receives the notification information and the completion notification from the notification process module 5-3, the application adapter unit 12 converts the notification information into a data format in conformity with the notification interface of the process manager unit 13, and transfers the converted notification information along with the completion notification to the process manager unit 13 (Step S316). On the basis of the determination result and the notification destination indicated by the received notification information, the process manager unit 13 outputs the notification information to a device indicated as the notification destination. Specifically, the process manager unit 13 transfers the notification information to the driver unit 11, and also instructs the driver unit 11 to notify the device 4 as the notification destination of the notification information (Step S317). The driver unit 11 outputs the notification information to the device 4 (Step S318).

Next, with reference to FIGS. 14 to 20, generation of setting information using the setting management device 20 illustrated in FIG. 3 will be explained.

Figure 14:
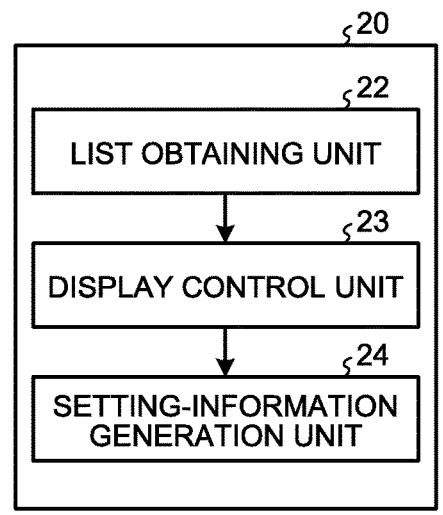
FIG. 14 is a diagram illustrating a configuration of a setting management device illustrated in FIG. 3.

FIG. 14 is a diagram illustrating a configuration of the setting management device 20 illustrated in FIG. 3.

The setting management device 20 generates setting information to be used by the data processing device 10, and it is connected to the data processing device 10 via a communication path.

The setting management device 20 includes a list obtaining unit 22, a display control unit 23, and a setting-information generation unit 24. The list obtaining unit 22 obtains a list describing the names of functional processes that can be supported by the data processing device 10 from the data processing device 10. For example, this list describes the application 5 that can be supported by the application adapter unit 12, a functional process module in this application 5, and the name of the device 4 connectable to the driver unit 11. Specifically, the list obtaining unit 22 transmits a list request message to the application adapter unit 12 or the message relay unit 15. The application adapter unit 12 extracts a list of the application 5 from the data storing unit 14 and transmits the list to the setting management device 20. When the message relay unit 15 receives the message, the message relay unit 15 transfers the received message to the driver unit 11. The driver unit 11 then obtains the list from the data storing unit 14 and transmits the list to the setting management device 20 via the message relay unit 15. The display control unit 23 displays a setting-information generation screen used for drawing a process flowchart in which a plurality of objects corresponding to respective functional processes included in the list obtained by the list obtaining unit 22 are connected with a line. The setting-information generation screen is described below in detail. The setting-information generation unit 24 generates setting information on the basis of information input to a screen displayed by the display control unit 23. For example, the setting-information generation unit 24 can generate setting information on the basis of a process flow of a process flowchart drawn on the setting-information generation screen. The setting-information generation unit 24 transmits the generated setting information to the data processing device 10 so that the setting information can be stored in the data storing unit 14 included in the data processing device 10.

In a case where an additional process flowchart is created, the setting-information generation unit 24 generates setting information on the basis of the created process flowchart. It is also permissible that arrangement of functional processes, which is a created process flowchart drawn on the setting-information generation screen, is changed by a user's operation and the setting information is updated on the basis of the process flowchart with the changed arrangement. Specifically, when the display control unit 23 displays a created process flowchart, the setting-information generation unit 24 extracts setting information corresponding to this displayed process flowchart from the data storing unit 14. Next, when the setting-information generation unit 24 determines that arrangement of objects in the process flowchart displayed by the display control unit 23 has been changed, then the setting-information generation unit 24 updates data in the setting information, such as the sequence and input data, with the details of the changed arrangement.

Figure 15:
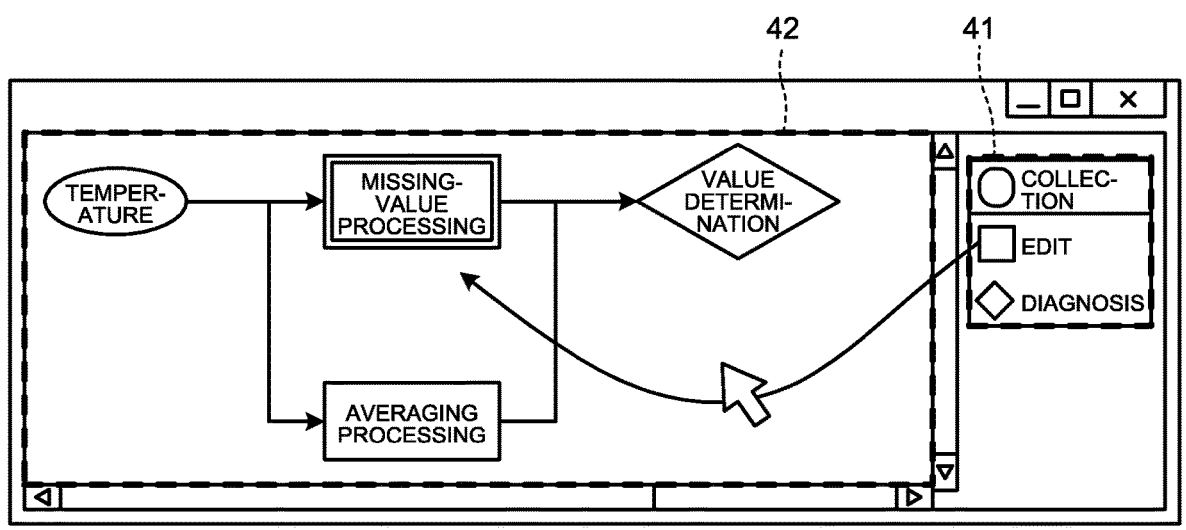
FIG. 15 is a diagram illustrating a first example of a setting-information generation screen displayed by a setting management device illustrated in FIG. 14.

FIG. 15 is a diagram illustrating a first example of the setting-information generation screen displayed by the setting management device 20. The setting management device 20 generates a flow of a series of functional processes performed by the data processing device 10, and stores setting information indicating the generated process flow in the data storing unit 14 of the data processing device 10. With this operation, the data processing device 10 can set the series of functional process to be performed. The setting-information generation screen illustrated in FIG. 15 includes a candidate-process display region 41 and a drawing region 42. The candidate-process display region 41 displays objects showing multiple types of functional process modules that can be used in a process flow. The functional process module corresponds to the collection process of collecting the industrial data 33 from the device 4 or the process to be performed by the application 5. In FIG. 15, objects showing the collection process, the edit process, and the diagnosis process are displayed. A user operating the data processing device 10 can perform a drag-and-drop operation, such as selecting an object showing each of the functional process modules displayed in the candidate-process display region 41 on this setting-information generation screen, then moving the object to the drawing region 42, and thereafter clearing the selection of the object in the drawing region 42, so as to arrange each of the functional process modules in the drawing region 42. For example, when a user selects an object arranged in the drawing region 42, configurable candidates for details of each functional process module are displayed such that the user can select an object from among the displayed candidates. For example, when a user selects a collection object arranged in the drawing region 42, candidates for the industrial data 33 to be collected such as a temperature and a voltage are displayed so that the user can select the industrial data 33 from among these candidates. Thereafter, the user draws a direction in which data flows between graphic objects showing the respective functional process modules displayed in the drawing region 42 with an arrow. The process flow as illustrated in FIG. 15 is thereby completed.

Figure 16:
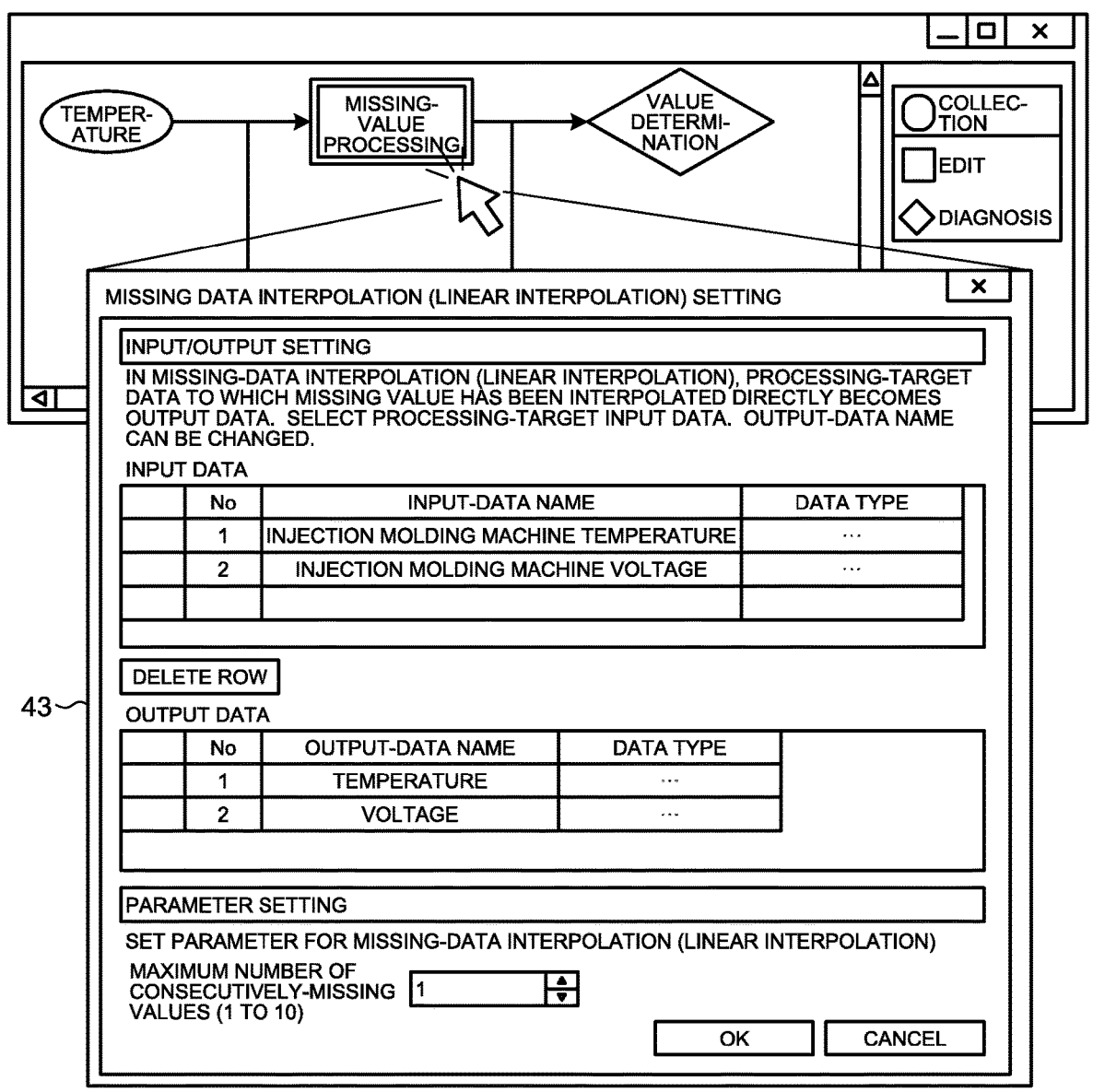
FIG. 16 is a diagram illustrating a detail setting screen linked with the setting-information generation screen illustrated in FIG. 15.

FIG. 16 is a diagram illustrating a detail setting screen linked with the setting-information generation screen illustrated in FIG. 15. When a user double-clicks each object displayed in the drawing region 42 on the setting-information generation screen illustrated in FIG. 15, a detail setting screen 43 is displayed. By using the detail setting screen 43, the user can set input data to and output data from a functional process module shown by each object, and can also set a parameter to be used for this functional process module. FIG. 16 illustrates the detail setting screen 43 corresponding to missing-value processing as an example of the detail setting screen. Different details are displayed on the detail setting screen corresponding to each of the objects illustrated in FIG. 15. Candidate values are displayed on the detail setting screen 43 as selectable input data. The user selects input data to be used in a process flow being generated from among these candidate values. The missing-value processing is to interpolate the missing value between one data point and another data point in a series of data if data fails to be obtained. In the missing-value processing, processing-target data to which the missing value has been interpolated directly becomes output data. Accordingly, as input data is selected, output data is automatically determined. By using the detail setting screen 43, the user can further set a parameter to be used in this functional process module. In a case where there are a plurality of consecutively-missing values, a maximum number of consecutively-missing values, which indicates how many consecutively-missing values can be interpolated at most, can be set on the detail setting screen 43. The setting management device 20 generates setting information on the basis of information input to the setting-information generation screen.

FIG. 17 is a diagram illustrating a second example of the setting-information generation screen displayed by the setting management device 20. On this setting-information generation screen, a process flow can be generated by a user inputting details of the process flow in cells. The setting-information generation screen includes a cell display region 44. A single row of the table displayed in the cell display region 44 corresponds to a single functional process module. The column-wise sorting sequence indicates the execution sequence of the functional process modules. By inputting information in the cell display region 44, the user can set details of each of the functional process modules.

FIG. 18 is a diagram illustrating a detail setting screen linked with the setting-information generation screen illustrated in FIG. 17. When a user clicks a button 442 for the process details of each functional process module, which is displayed in the cell display region 44 on the setting-information generation screen illustrated in FIG. 17, the detail setting screen 43 is displayed. Because the detail setting screen 43 in FIG. 18 is identical to the detail setting screen 43 illustrated in FIG. 16, detailed descriptions thereof are omitted.

FIG. 19 is a diagram illustrating a third example of the setting-information generation screen displayed by the setting management device 20. This setting-information generation screen includes an automatically drawing region 45 in addition to the cell display region 44 illustrated in FIG. 17. When information is input in the cell display region 44, the setting management device 20 draws a process flow in the automatically drawing region 45 on the basis of the input information.

FIG. 20 is a diagram illustrating a detail setting screen linked with the setting-information generation screen illustrated in FIG. 19. When a user clicks the button 442 for the process details of each functional process module, which is displayed in the cell display region 44 on the setting-information generation screen illustrated in FIG. 19, the detail setting screen 43 is displayed. Because the detail setting screen 43 in FIG. 20 is identical to the detail setting screen 43 illustrated in FIG. 16, detailed descriptions thereof are omitted.

Further, the data processing device 10 can execute the application 5 created on the basis of the application programming interface (API) specifications publicly available to users. That is, the data processing device 10 is configured to be capable of implementing a series of functional processes by executing functional process modules of the application 5 on the basis of the execution sequence of the functional process modules set by the setting management device 20. Examples of the functions provided by the API include an initialization function of allocating a memory and resources to a process, an input and edit function of receiving data from an immediately-preceding functional process and editing the received data, an output function of transferring the edited data to an immediately-subsequent functional process, and a reset function of freeing the memory and resources. These functions are implemented during a normal operation. The initialization function is implemented when settings take effect in the data processing device 10. The input and edit function is implemented each time data has arrived from the immediately-preceding functional process after the data processing device 10 starts operating. The output function is implemented each time data is transferred to the immediately-subsequent functional process during the operation of the data processing device 10. The reset function is implemented when the data processing device 10 stops operating. Examples of the functions provided by the API further include a program-name response function of responding with a program name identifying each program, a function of responding with column information on input data that can be received by the data processing device 10, and a function of responding with column information on data output by the data processing device 10. The function of responding with a program name is implemented to display a character string of a program name 441 on the setting-information generation screen illustrated in FIG. 17. The function of responding with an input-data column and the function of responding with an output-data column are implemented to display character strings of an input-data name 443 and an output-data name 444 on the detail setting screen 43 illustrated in FIG. 18.

Figure 21:
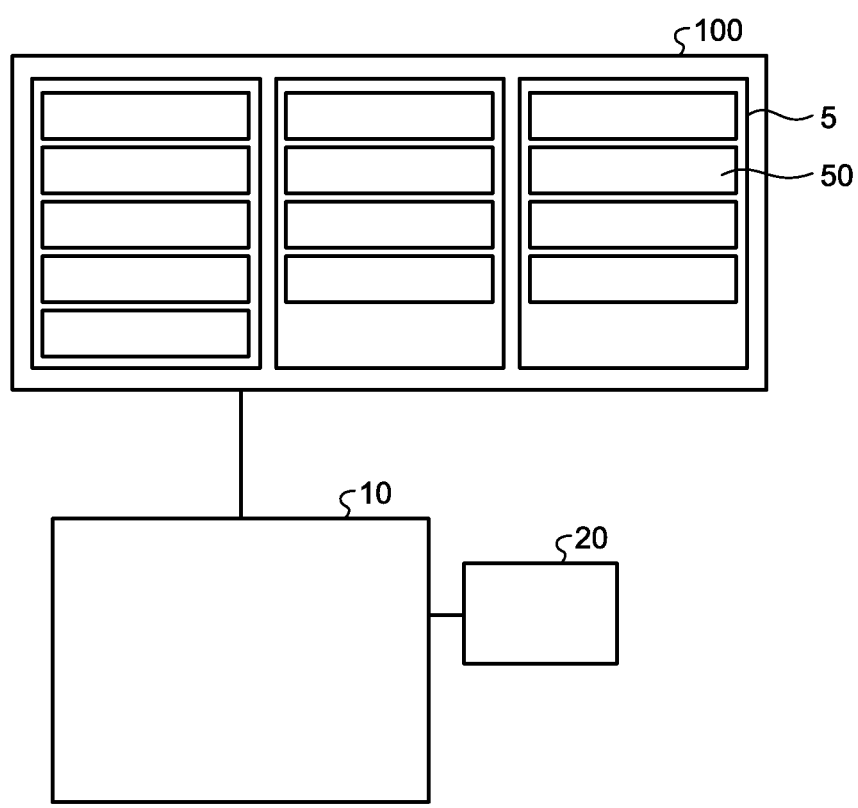
FIG. 21 is a diagram illustrating an example in which the data processing device illustrated in FIG. 3 obtains an application or a functional process module stored in the cloud.

Further, as illustrated in FIG. 21, the application 5 or a functional process module 50 created on the basis of the API specifications is registered in advance in a cloud server 100 that is an external server. The data processing device 10 downloads the application 5 or the functional process module 50 from the cloud server 100, and stores the downloaded application 5 or functional process module 50 in the data storing unit 14 to thereby perform an additional functional process on the basis of the downloaded application 5 or functional process module 50. Specifically, the cloud server 100 includes a storage unit for recording therein the application 5 or the functional process module 50 of the data processing device 10. This storage unit is configured to store therein the application 5 or the functional process module 50 and a list of functional processes that can be performed by the data processing device 10. The setting management device 20 accesses the cloud server 100 via the data processing device 10. A user operates the setting-information generation screen illustrated in FIGS. 15, 17, and 19. The application 5 or the functional process module 50 selected by a user's operation is stored in the data storing unit 14 of the data processing device 10. Next, the data processing device 10 executes the functional process module 50 in the sequence set by the setting management device 20 to thereby perform an additional functional process in a series of processes. In the present embodiment, the data processing device 10 is configured to perform an additional functional process on the basis of the application 5 or the functional process module 50 downloaded from the cloud server 100. It is also permissible that the data processing device 10 performs an additional functional process by directly using the application 5 or the functional process module 50 registered in the cloud server 100.

As described above, according to the embodiment of the present invention, the process manager unit 13 in the data processing device 10 can perform a series of functional processes by executing a plurality of functional process modules on the basis of setting information for the execution sequence of the functional process modules. In addition, input data to be handled by the functional process modules has been set in the setting information. The process manager unit 13 outputs the input data to be used in the executed functional process modules to the functional process modules at a necessary timing. The input data output by the process manager unit 13 is data output by executing the preceding functional process module. In the manner as described above, the process manager unit 13 controls the execution sequence of a plurality of functional process modules and output data to each of the functional process modules. Accordingly, data communication between a plurality of functional process modules can be synchronized.

The data processing device 10 can easily change the details of each functional process constituting a series of functional processes and extend the series of functional processes by changing the device 4 or the application 5. Each functional process is performed by implementing its corresponding functional process module. The process manager unit 13 is configured to execute a functional process module on the basis of setting information for the execution sequence of functional process modules, and thus can also easily synchronize data communication with an additional or changed functional process module.

When the process manager unit 13 causes the driver unit 11 to obtain the industrial data 33, the process manager unit 13 stores in the data storing unit 14 the industrial data 33 along with a time stamp that is data-obtaining time information indicating the time at which the industrial data 33 is obtained. On the basis of the time stamp, the process manager unit 13 selects, from among frames of the stored time-stamped industrial data, input data input to the next application 5 to be executed. With this operation, even in a case where the process manager unit 13 performs a series of functional processes using a plurality of applications 5, it is still possible to accurately perform functional processes by synchronizing data communication between the functional processes.

The configurations described in the above embodiment are only examples of an aspect of the present invention. The configurations can be combined with other well-known techniques, and part of each configuration can be omitted or modified without departing from the scope of the present invention.

In the embodiment described above, while the functions of the data processing device 10 are realized by using single hardware for example, the present invention is not limited to the example. For example, the functions of the data processing device 10 can be realized by using distributed processing using a cloud environment.

REFERENCE SIGNS LIST

1 data processing system, 4 device, 4A production device, 4B controller, 4C sensor, 5 application, 10 data processing device, 11 driver unit, application adapter unit, 13 process manager unit, 14 data storing unit, 14A functional-process-module storage unit, 14B setting-information storage unit, 15 message relay unit, 16 library management unit, 20 setting management device, 22 list obtaining unit, 23 display control unit, 24 setting-information generation unit, 31 input/output information, 32 time stamp, 33 industrial data, 91 CPU, 92 RAM, 93 HDD, 100 cloud server, 121 communication control unit, 131 synchronous control unit.

The invention claimed is:

1. A data processing device comprising:
a functional-process-module memory to store a plurality of functional process modules for data processing;
a setting-information memory to store setting information including an execution sequence of the plurality of functional process modules, target input data on which each of the functional process modules performs a functional process, information on a data format of input data, the data format being supported by each of the functional process modules, and information on a data format of output data output by each of the functional process modules;
an adapter to convert a data format of the target input data and the output data in accordance with the setting information; and
a process manager circuit to control data communication performed by the adapter on a basis of the setting information and cause the functional process module to perform a functional process on the target input data on a basis of the execution sequence of the functional process modules set in the setting information,
wherein the functional process modules include a data edit module to perform a data edit process, a data diagnosis module to perform a diagnosis process on data having undergone an edit process by the data edit module, and a notification module to perform a notification process of a diagnosis result from the data diagnosis module, and
the process manager circuit is configured to sequentially instruct the data edit process, the diagnosis process, and the notification process, in the functional process modules, to be performed on the target input data based on the execution sequence of the functional process modules set in the setting information.

2. The data processing device according to claim 1, comprising a driver circuit to connect to a device that obtains industrial data, wherein
the process manager circuit controls the driver circuit to cause the device to obtain industrial data.

3. The data processing device according to claim 2, wherein when the process manager circuit obtains industrial data from outside, the process manager circuit stores the industrial data in a data memory along with data-obtaining sequence identification information indicating a time at which the industrial data is obtained, and selects, on a basis of the data-obtaining sequence identification information, at least a portion of the obtained industrial data as the target input data to be handled by the functional process module to be executed.

4. The data processing device according to claim 1, wherein when the process manager circuit obtains industrial data from outside, the process manager circuit stores the industrial data in a data memory along with data-obtaining sequence identification information indicating a time at which the industrial data is obtained, and selects, on a basis of the data-obtaining sequence identification information, at least a portion of the obtained industrial data as the target input data to be handled by the functional process module to be executed.

5. The data processing device according to claim 4, wherein the process manager circuit executes a plurality of the functional process modules in parallel with each other, and causes each of the functional process modules to process input data on a basis of the execution sequence of the functional process modules in the setting information.

6. The data processing device according to claim 1, wherein the process manager circuit is configured to sequentially perform each of the data edit process, the diagnosis process, and the notification process on each frame of target input data in a plurality of frames of target input data.

7. The data processing device according to claim 1, wherein the process manager circuit is configured to repeatedly perform each of the data edit process, the diagnosis process, and the notification process on each of a predetermined number of frames of target input data.

8. The data processing device according to claim 1, wherein the setting information indicates whether a corresponding one of the data edit module, the data diagnosis, and the notification module is executed as one of an external server application executed by an external server, a real-time processing application executed by the process manager circuit that returns a result in real-time, and an offline analyzation application executed by the process manager circuit that can analyze a result offline and independently from the real-time processing application.

9. A data processing method comprising:
  storing a functional process module for data processing in a functional-process-module memory;
  storing, in a setting-information memory, setting information that includes an execution sequence of a plurality of the functional process modules, target input data on which each of the functional process modules performs a functional process, information on a data format of input data, the data format being supported by each of the functional process modules, and information on a data format of output data output by each of the functional process modules as setting information, wherein the functional process modules include a data edit module to perform a data edit process, a data diagnosis module to perform a diagnosis process on data having undergone an edit process by the data edit module, and a notification module to perform a notification process of a diagnosis result from the data diagnosis module; and
  selecting functional process modules to perform a functional process on a basis of the execution sequence set in the setting information;
  converting a data format of the target input data provided to the selected functional process modules on a basis of the setting information;
  sequentially instructing the data edit process, the diagnosis process, and the notification process, using the selected functional process modules, to be performed on the target input data based on the execution sequence of the functional process modules set in the setting information; and
  converting a data format of output data from the selected functional process modules on a basis of the setting information.

10. The data processing method according to claim 9, wherein the converting a data format of input data includes obtaining data from outside by controlling a driver circuit to connect to a device that obtains data.

11. A data processing system comprising:
  an external server to store a plurality of functional process modules that process data; and
  a data processing device including
  a functional-process-module memory to store the plurality of functional process modules obtained from the external server,
  a setting-information memory to store setting information including an execution sequence of a plurality of the functional process modules, target input data on which each of the functional process modules performs a functional process, information on a data format of input data, the data format being supported by each of the functional process modules, and information on a data format of output data output by each of the functional process modules,
  an adapter to convert a data format of the target input data and the output data in accordance with the setting information, and
  a process manager circuit to control data communication performed by the adapter on a basis of the setting information and cause the functional process module to perform a functional process on the target input data on a basis of the execution sequence of the functional process modules set in the setting information,
  wherein the functional process modules include a data edit module to perform a data edit process, a data diagnosis module to perform a diagnosis process on data having undergone an edit process by the data edit module, and a notification module to perform a notification process of a diagnosis result from the data diagnosis module, and
  the process manager circuit is configured to sequentially instruct the data edit process, the diagnosis process, and the notification process, in the functional process modules, to be performed on the target input data based on the execution sequence of the functional process modules set in the setting information.

* * * * *